United States Patent [19]

Reinke et al.

[11] Patent Number: 5,846,157
[45] Date of Patent: Dec. 8, 1998

[54] INTEGRATED CONTROL OF A LEAN BURN ENGINE AND A CONTINUOUSLY VARIABLE TRANSMISSION

[75] Inventors: Paul Edward Reinke, Rochester Hills; Edward George Groff, Troy, both of Mich.

[73] Assignee: General Motors Corporation, Detroit, Mich.

[21] Appl. No.: 738,351

[22] Filed: Oct. 25, 1996

[51] Int. Cl.⁶ .................................................. B60K 41/12
[52] U.S. Cl. .............................. 477/48; 477/46; 477/107
[58] Field of Search ............................. 477/48, 46, 107; 123/673

[56] References Cited

U.S. PATENT DOCUMENTS

| | | | |
|---|---|---|---|
| 4,023,641 | 5/1977 | Ganoung | 180/66 R |
| 4,158,347 | 6/1979 | Aoki | 123/683 |
| 4,458,561 | 7/1984 | Frank | 477/44 |
| 4,546,673 | 10/1985 | Shigematsu et al. | 477/48 |
| 4,699,025 | 10/1987 | Omitsu | 477/43 |
| 4,791,902 | 12/1988 | Ishikawa . | |
| 5,046,177 | 9/1991 | Vahabzadeh . | |
| 5,115,782 | 5/1992 | Klinke et al. | 123/673 X |
| 5,243,881 | 9/1993 | Hayashi | 477/45 |
| 5,443,594 | 8/1995 | Takada et al. | 477/98 |
| 5,468,195 | 11/1995 | Kashiwabara | 477/46 |
| 5,478,293 | 12/1995 | Yonezawa | 477/107 X |
| 5,568,387 | 10/1996 | Andersson | 477/107 X |
| 5,651,353 | 7/1997 | Allston | 123/673 |
| 5,655,992 | 8/1997 | Hattori | 477/107 |
| 5,660,157 | 8/1997 | Minowa et al. | 123/416 |

OTHER PUBLICATIONS

Article—Car and Driver Feb. 1996 entitled "Honda Civic HX CVT" (3 pages total) pp. 75–77.

*Primary Examiner*—Rodney H. Bonck
*Assistant Examiner*—Peter T. Kwon
*Attorney, Agent, or Firm*—Michael J. Bridges

[57] ABSTRACT

A powertrain control method applied to a lean burn engine coupled to a continuously variable transmission for minimizing engine out emissions selects one or more control parameters from a plurality of parameters that may be precisely controlled to provide for acceptable powertrain control with minimized emissions. Lean burn engine operation is maintained under low brake mean effective pressure conditions by modulating powertrain output power through transmission drive ratio variation. Fuel and air per cylinder may further be varied with the drive ratio when low emissions can be provided with minimum sacrifice to fuel economy. Lean burn operation is suspended under high brake mean effective pressure conditions by driving air/fuel ratio toward the stoichiometric ratio to exploit the efficiency of an included three-way catalytic treatment device while lowering engine speed to stabilize combustion.

2 Claims, 6 Drawing Sheets

INTEGRATED CONTROL OF A LEAN BURN ENGINE AND A CONTINUOUSLY VARIABLE TRANSMISSION

TECHNICAL FIELD

This invention relates to automotive powertrain control and, more particularly, to integrated control of a continuously variable transmission and a lean burn internal combustion engine.

BACKGROUND OF THE INVENTION

Figure 1:
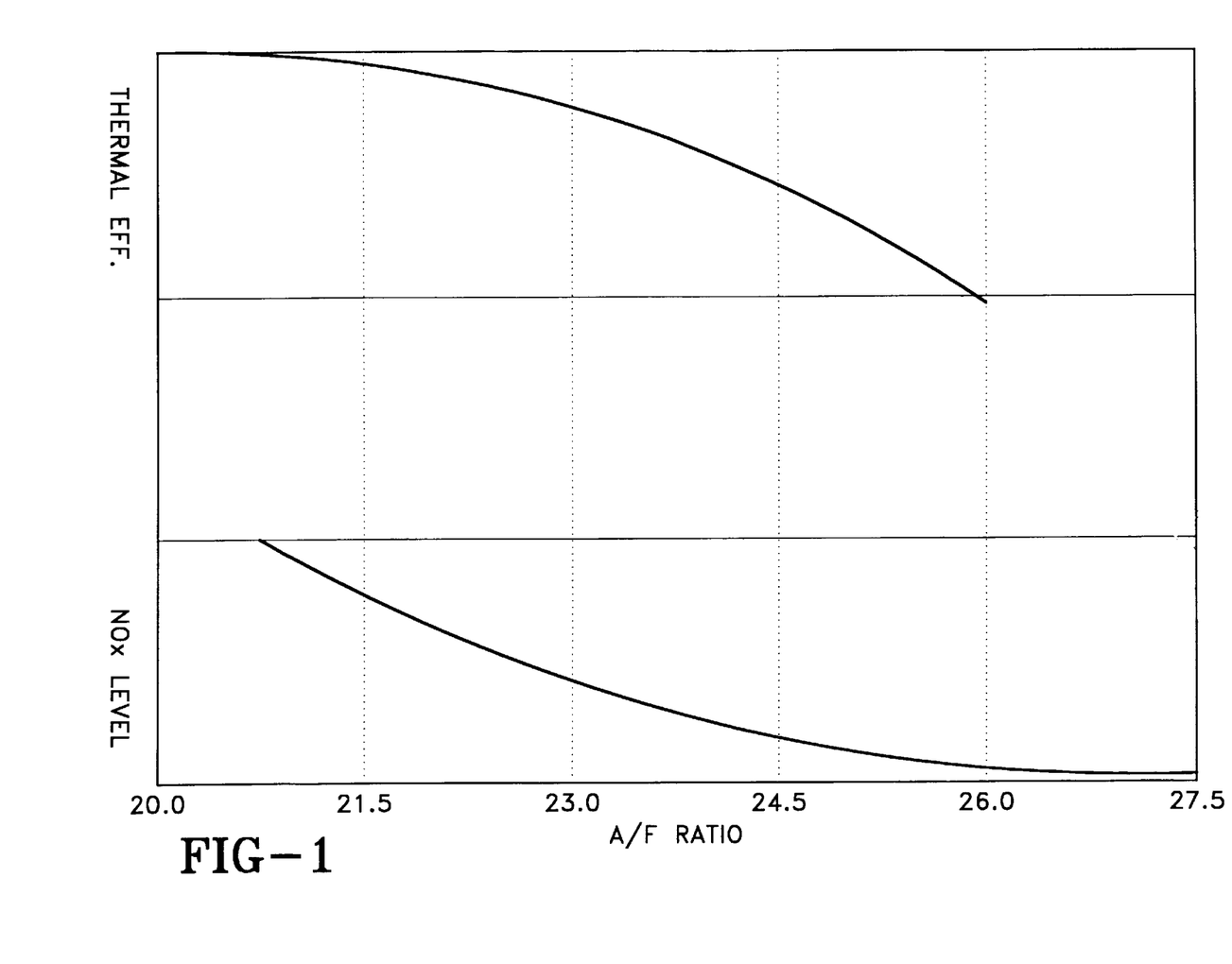
FIG. 1 is a diagram illustrating the variation in thermal efficiency and NOx emissions as a function of engine air/fuel ratio for a lean burn engine application.

Lean burn gasoline engines, in which the air-fuel charge delivered to engine cylinders for combustion is diluted with excess air, offer the capability of providing high thermal efficiency while achieving low engine out emissions. However, a lean burn engine places exceptional demands on an engine control system, largely because very little engine out emissions of oxides of nitrogen (NOx) can be tolerated. More specifically, conventional catalytic treatment devices function poorly to reduce the undesirable element of NOx in lean burn engine exhaust, as the lean burn engine does not operate at or near a stoichiometric air/fuel ratio. An efficient means of treating lean burn engine exhaust to significantly reduce NOx is not conventionally available. Proposed "lean catalytic treatment devices" that operate to reduce NOx emissions for a lean air/fuel mixture may be significantly less efficient than conventional devices under stoichiometric engine operation. Accordingly, the lean burn engine must itself minimize NOx emissions. As illustrated in FIG. 1, a lean (high numerical value) air/fuel ratio is required in a lean burn engine application to minimize NOx emissions. However, at lean air/fuel ratios near the limit of flame propagation for premixed charge engines, combustion variability increases reducing vehicle driveability, and thermal efficiency decreases, as further illustrated in FIG. 1. Such combustion variability can increase emissions of hydrocarbons (HC), another undesirable component of engine exhaust gas.

Figure 2:
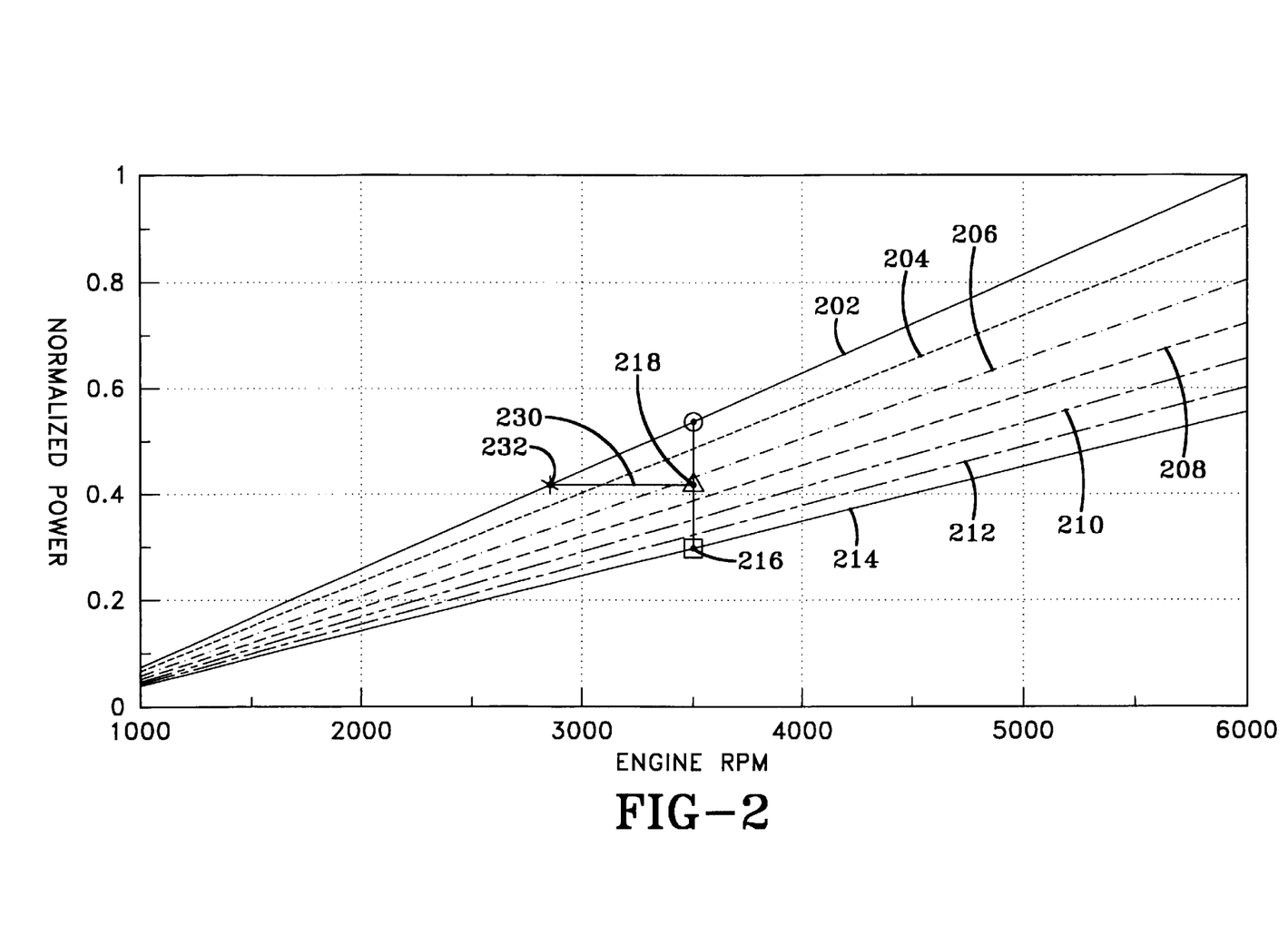
FIG. 2 is a diagram illustrating a relationship between engine speed and engine power for a plurality of engine air/fuel ratios.

FIG. 2 illustrates normalized engine output power as a function of engine speed for various engine air/fuel ratio settings. Curve 202 corresponds substantially to a stoichiometric air/fuel ratio (about 14.5:1), curve 204 to a ratio of about 16:1, curve 206 to a ratio of about 18:1, curve 208 to a ratio of about 20:1, curve 210 to a ratio of about 22:1, curve 212 to a ratio of about 24:1, and curve 214 to a ratio of about 26:1. For given engine operating conditions, a desired engine output power may be met with a specific engine intake manifold pressure, air/fuel ratio, and engine speed as indicated by point 216 in FIG. 2. A demand for an increase in engine output power may be met through conventional engine controls as illustrated by the line from point 216 to point 218 in which engine air/fuel ratio is enrichened, for example through increase in fueling. The enriched air/fuel ratio increases engine out NOx, which may be not be properly treated in a conventional catalytic treatment device or in a lean catalytic treatment device having a lower treatment efficiency.

Figure 3:
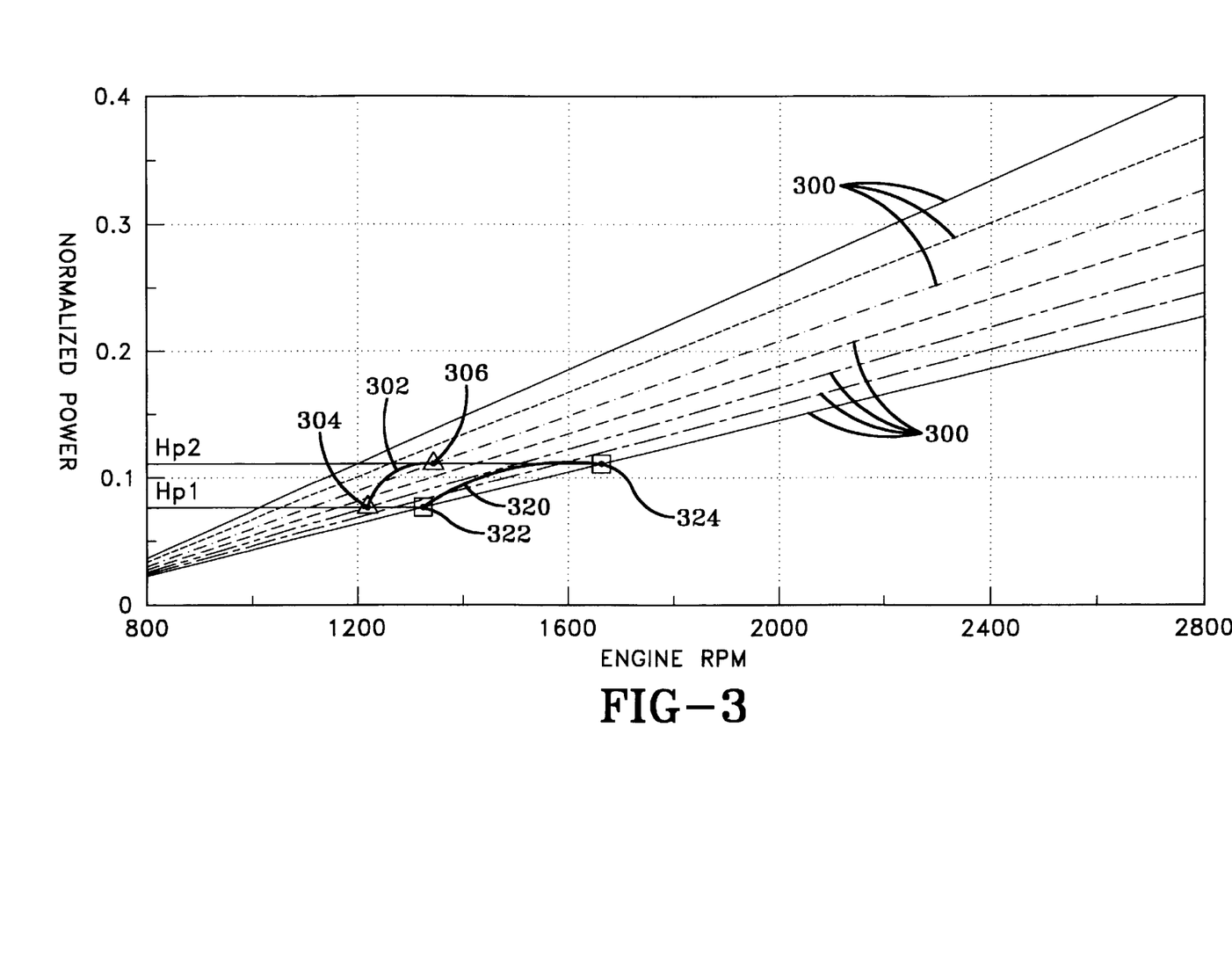
FIG. 3 is a diagram illustrating strategies for varying engine output power through variation in BMEP and through variation in engine speed.

Engine output power is proportional to the product of engine speed and brake mean effective pressure (BMEP), which generally corresponds to engine cylinder combustion pressure. In a lean burn engine application, BMEP is driven by engine fuel/cylinder, as excess air is available for consumption. The power increase generated in going from point 216 to point 218 in FIG. 2 corresponds to an increase in BMEP, as engine speed is fixed. The increase in BMEP is conventionally delivered through an increase in engine fuel/cylinder (the amount of fuel delivered to an engine cylinder for combustion during an engine cylinder combustion event), which enriches air/fuel ratio and increases engine out NOx emissions. Curve 302 of FIG. 3 illustrates this principle for a typical conventional fixed gear transmission coupled to a lean burn engine application. As a demand for increased engine output power is received while operating at point 304, engine intake air rate is increased, such as through an increase in an opening of an engine intake air valve, and engine fuel/cylinder is increased, leading to an increase in engine power along curve 302 toward point 306. When engine intake air/cylinder reaches a maximum, a further power increase is conventionally obtained by increasing engine fuel/cylinder, which enrichens engine air/fuel ratio and increases BMEP. Early in the transient, both the BMEP and the engine air/fuel ratio move to extremely high NOx production regions, as engine speed is only changing slightly.

It would be desirable to coordinate control of engine cylinder intake air and injected fuel with control of transmission drive ratio to meet powertrain output power requirements while minimizing overall emissions. It would further be desirable to maximize fuel economy without unacceptably increasing emissions. While control of engine fuel and air must be closely coordinated to minimize engine out emissions, the different time constant of the fuel and air control systems should be accounted for under transient operating conditions to avoid air/fuel ratio excursions outside narrow ranges throughout the transient condition, to avoid poor driveability or high emissions during the transient condition. It would therefore be further desirable to provide for precise coordinated control of air and fuel during transient operating conditions in a lean burn engine application.

SUMMARY OF THE INVENTION

The present invention provides for integrated engine and transmission control in a lean burn engine application in which control of a transmission having a continuously variable transmission ratio is coordinated with control of the engine to minimize engine emissions and maximize engine fuel economy while maintaining desirable engine performance.

More specifically, selective control of engine intake fuel, engine intake air, transmission drive ratio and overall engine air/fuel ratio is provided in response to engine operating conditions to balance the often competing goals of low engine out emissions, stable engine operation, and high fuel economy. For example, a demand for an increase in engine output power is met under predetermined lean burn engine operating conditions through change in engine speed, allowing for maintained lean operation with reduced NOx emissions levels. Curve 320 of FIG. 3 illustrates that, starting at a point 322, a demand for an increase in engine output power from HP1 to HP2 is not met through immediate enrichment as in the described prior art, but rather through increase of the transmission drive ratio to a specific ratio providing for the demanded increase in engine output power through an increase in engine speed from a speed at point 322 to a speed at point 324 along curve 320. Both BMEP and air/fuel ratio may thus be maintained at low NOx production levels. Since power is linearly proportional to the product of BMEP and engine speed, and NOx is approximately an exponential function of BMEP and only linearly proportional to engine speed, increasing engine speed at a low BMEP is a much more effective mechanism for increasing engine output power while achieving low NOx levels. However, any lag in transmission ratio change may require temporary compensation through enrichening of the air/fuel ratio to ensure adequate transient performance.

Further, under predetermined low-BMEP operating conditions, transmission drive ratio control may be used to lower engine speed, thereby increasing BMEP, as resulting increases in engine intake manifold pressure under lean operation could maintain overall lean mixtures and low engine out emissions levels, with an added benefit of increased engine fuel economy due to reduced engine friction and pumping losses. Still further, engine out hydrocarbon (HC) levels can be high under lean operation at low load and engine overrun (low cylinder pressure) conditions due to misfires and partial burn of the engine cylinder air-fuel charge. Such conditions may be identified and a strategy provided for reduced transmission drive ratio under such conditions to reduce engine speed and increase combustion stability, thereby reducing HC emissions.

Still further, "mixed mode" control may be implemented in which engine air/fuel ratio is switched between a lean ratio range and a stoichiometric ratio depending on engine operating conditions. More specifically, while operating within a lean air/fuel ratio range but under conditions associated with high BMEP (and therefore high NOx emissions), the emissions reduction capability of an included catalytic treatment device may be exploited by dropping engine speed through a decrease in transmission drive ratio while fuel/cylinder is increased to drive air/fuel ratio toward stoichiometry, allowing for efficient treatment of such engine emissions elements as NOx and hydrocarbons (HC) by the catalytic treatment device. Curve 230 of FIG. 2 illustrates such a switch to a stoichiometric ratio under mixed mode control, from lean operating point 218 to stoichiometric operating point 232. Following a return to predetermined low BMEP operating conditions under such mixed mode control, engine speed may be increased through an increase in transmission drive ratio while decreasing fuel/cylinder to return to lean engine operation to provide for engine operation with high thermal efficiency and low engine out emissions.

BRIEF DESCRIPTION OF THE DRAWINGS

The invention may be best understood by reference to the preferred embodiment and to the drawings in which.

DESCRIPTION OF THE PREFERRED EMBODIMENT

Figure 4:
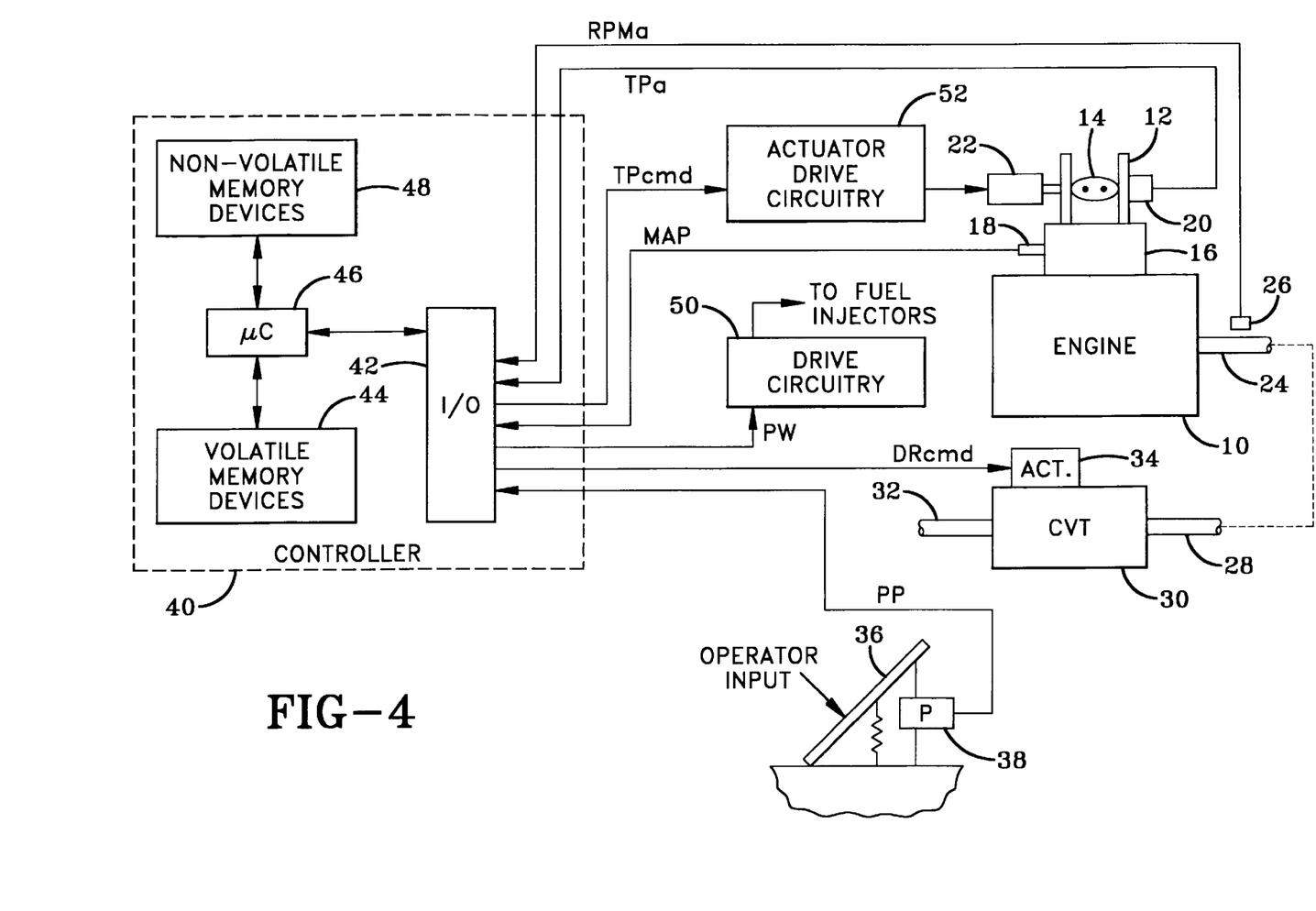
FIG. 4 is a general diagram of powertrain hardware and control hardware of the preferred embodiment of this invention.

Referring to FIG. 4, internal combustion 10 receives intake air through intake air bore 12 into intake manifold 16 for distribution to engine cylinders (not shown). Intake air valve 14 in the form of a butterfly or rotary valve is positioned in the intake air bore 12 and is controlled to vary restriction to intake air passing through the bore 12. In this embodiment, the intake air valve is electronically controlled, wherein the valve 14 is mechanically linked to a rotary actuator 22 of the DC motor or stepper motor type so as to rotate with the actuator in response to a current command generated by actuator drive circuitry 52, of a full H-bridge configuration, controlled by a throttle position command TPcmd issued by an electronic controller 40, to be described. The rotational position of the intake air valve 14 is transduced by rotary position sensor 20 of the potentiometric type into output signal TPa.

Mass airflow sensor 28 of the thick film or hot wire type is disposed in position to transduce the mass airflow through the bore into output signal MAF. The absolute air pressure in the intake manifold 16 is transduced by conventional pressure transducer 18 into output signal MAP. Engine coolant is circulated through passages throughout the engine 10. A temperature transducer 54 in the form of the thermocouple or thermistor is positioned in a coolant circulation passage for transducing coolant temperature into output signal TEMP.

The intake air passing through the intake manifold 16 is combined with an injected fuel quantity at a controlled ratio of air mass to fuel mass (air/fuel ratio) and is delivered for combustion to engine cylinders. Pistons (not shown) are positioned within the cylinders for reciprocal motion therein driven by combustion pressure in the cylinders. The pistons are mechanically linked to an engine output shaft 24, such as a crankshaft which is mechanically linked to a transmission (CVT) 30 having a continuously variable drive ratio, such as the transmission described in U.S. Pat. No. 5,046,177, assigned to the assignee of this application. Drive ratio control signal DRcmd dictates the desired transmission drive ratio and is applied to actuator 34 of the type described in U.S. Pat. No. 5,046,177 for varying the drive ratio, which is the ratio of the rotational rate of shaft 24 to a transmission output shaft 32 linked to driven wheels of an automotive vehicle. Output shaft 24 includes a plurality of spaced teeth or notches about a circumferential portion thereof. Transducer 26, in the form of a Hall effect sensor, a variable reluctance sensor or a magnetoresistive sensor is fixed in position in proximity to the teeth or notches to transduce passage of the teeth or notches by the sensor 26 into measurable variation in sensor output signal RPMa. The frequency of such signal variations is directly proportional to engine speed (rate of rotation of output shaft 24). Accelerator pedal 36 is manually depressed away from a rest position by a powertrain operator indicating a desired engine output power level, the degree of depression being transduced by conventional potentiometric position transducer 38 into output signal PP. A barometric pressure sensor of any conventional design (not shown) may be provided for generating signal BARO indicating ambient barometric pressure. Alternatively, barometric pressure may be determined from signal MAP under conditions in which substantially no pressure drop is expected across intake air valve 16, such as prior to an engine running condition or under certain wide open intake air valve conditions.

Controller 40 is provided for carrying out control, diagnostic, and maintenance operations and includes such well-known elements as a microprocessor $\mu C$ 46, volatile memory devices 44 such as random access memory devices, non-volatile memory devices 48 such as read only memory devices and an input/output control unit I/O 42 for data transfer between the controller 40 and external devices. The I/O receives input signals including RPMa, TPa, MAP, PP, BARO, and TEMP and, through execution of a series of routines comprising step by step instructions stored in non-volatile memory devices 48, provides for powertrain control, diagnostic and maintenance operations including, in this embodiment, operations to coordinate control of engine fuel injection volume, engine intake air rate, and transmission drive ratio to provide for desirable engine performance with minimized engine emissions and maximized fuel economy in accord with the principles of this invention. A fuel injection command PW is issued in the form of an injector pulse width the duration of which corresponds to an injector open time during which pressurized fuel is metered to an intake runner (not shown) of an active engine cylinder, or directly into the cylinder in a direct injection engine application within the scope of this invention. PW is issued by controller 40 through its I/O 42 to injector drive circuitry 50 in the form of a high current driver which, for the duration of PW, issues a drive current to an active injector (an injector corresponding to an engine cylinder about to undergo its intake stroke) to drive the injector to an open position at a time and for a duration dictated by command PW.

Figure 5:
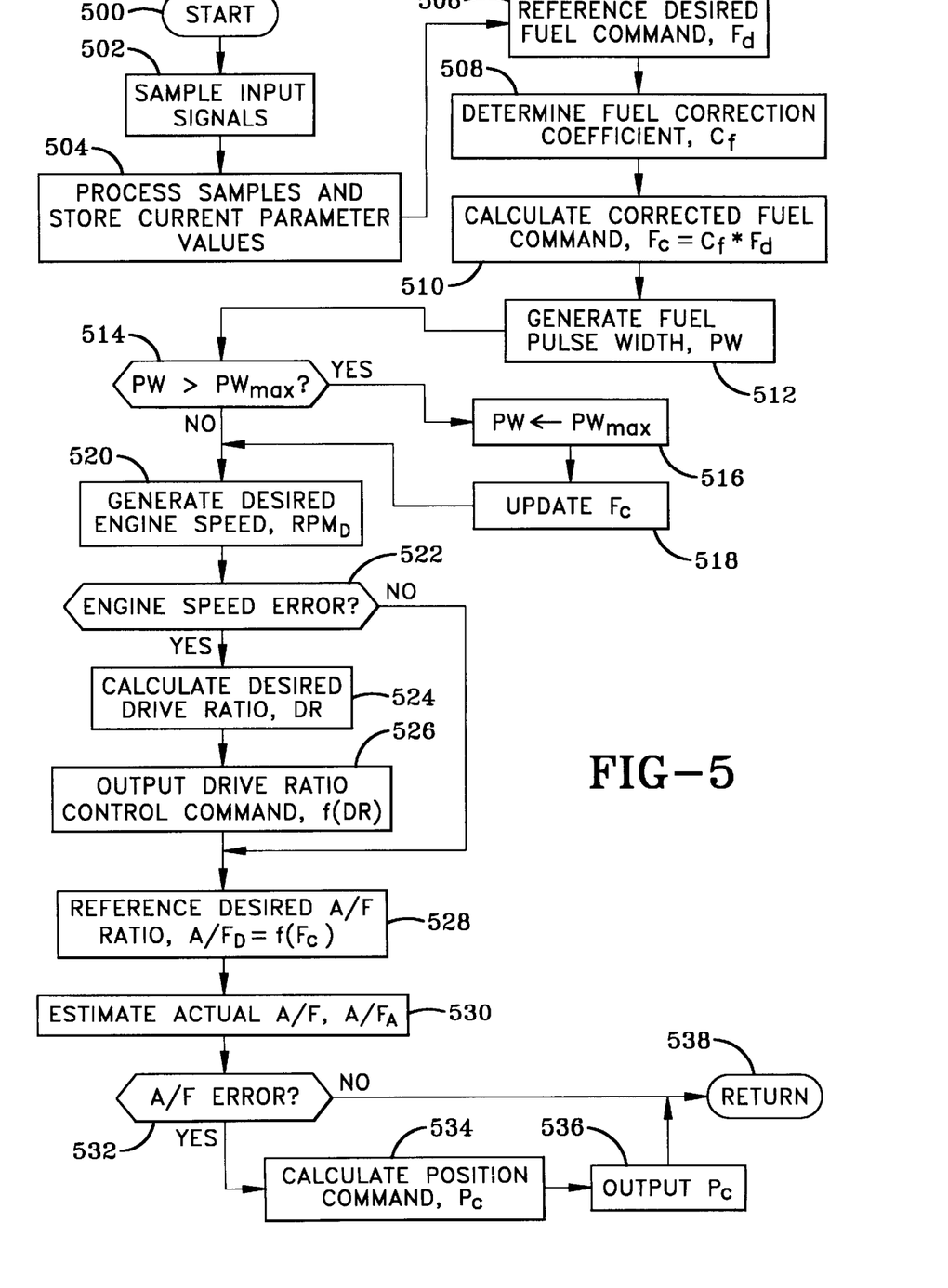
FIG. 5 is a flow diagram illustrating a flow of operations for carrying out control of the powertrain hardware of FIG. 4 in accord with the preferred embodiment of this invention.

More specifically, the operations of the routine illustrated in FIG. 5 are periodically carried out while the controller is active to carry out powertrain control operations, such as while a powertrain operator maintains ignition voltage to the controller 40. For example, the operations of FIG. 5 may be initiated every engine cylinder event such as each time an engine cylinder reaches an cylinder top dead center position prior to a cylinder intake stroke. Alternatively, the operations of FIG. 5 may be initiated following periodic controller timer events, such as about every ten milliseconds while the controller 40 is operating. When initiated, the routine of FIG. 5 begins at a step 500 and proceeds first to sample current values of input signals at a step 502 including the described signals RPMa, TPa, MAP, PP, TEMP, and BARO.

Figure 6:
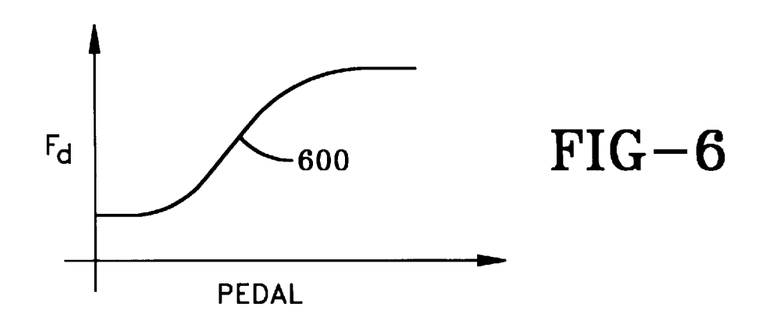
FIGS. 6–8 are diagrams of parameter relationships determined through calibration procedures and applied through the operations of FIG. 5.

The samples are next processed at a step 504 into current powertrain parameter values and are stored in volatile memory devices 44 of the controller 40. A desired fuel command Fd is next referenced at a step 506 from a stored schedule of command values as a function of current pedal position as indicated by the processed value of PP. Curve 600 of FIG. 6 illustrates a representative relationship, determined through a conventional calibration procedure in accordance with a preferred system response to change in pedal position, between Fd and PP. The schedule of Fd values may be stored in non-volatile memory devices 48 of FIG. 4 in the form of a standard lookup table or schedule. A correction coefficient C is next calculated at a step 508 to correct for the effects of varying barometric pressure as indicated by signal BARO, and varying temperature as indicated by signal TEMP, on mass airflow into the engine cylinders. C may be determined through a conventional calibration procedure by measuring the change in intake air mass for changing TEMP and BARO and storing the calibration results in a lookup table format wherein TEMP and BARO are applied to the table as index values for retrieving a corresponding correction coefficient C. A fuel command Fc is next determined at a step 510 as the product of the correction coefficient C and the desired fuel command Fd. A fuel injector pulse width PW corresponding to a command injector open time during which pressurized fuel is metered through the injector to the intake runner of an active engine cylinder or directly into the cylinder, as described, is next calculated at a step 512 as follows $$PW = K*(Fc/RPMa)$$

in which K is an experimentally determined proportionality factor to convert fuel rate divided by engine speed to a pulse width in units of milliseconds, which is substantially proportional to fuel quantity per engine cylinder. PW is next compared to a maximum allowable fuel pulsewidth PWmax at a step 514. PWmax may vary with BARO, TEMP, and RPMa and generally is the maximum amount of fuel that can be delivered to a cylinder at a maximum intake air valve opening position and at current engine speed without dropping below a predetermined air/fuel ratio limit. If PW exceeds PWmax at the step 514, it is set to PWmax at a next step 516 whereby any additional power requested through positioning of the pedal 36 of FIG. 1 will be provided, at the current engine speed RPMa, through increase in engine speed. The fuel command Fc is next updated at a step 516 as follows:

$$Fc = K*PW\ max\ *RPMa$$

to determine a new corrected fuel rate based on the limited pulsewidth and the current engine speed. Next, or if PW does not exceed PWmax at the step 514, a desired engine speed RPMd is calculated at a next step 520 for determining a desired transmission drive ratio in accord with this invention, for example to provide the powertrain output power demanded by the operator as communicated by the manual depression of pedal 36 of FIG. 1 with minimum emissions components of NOx, HC and CO, as described. In this embodiment, RPMd is determined as a function of the fuel command Fc and is coordinated with a determination of desired engine air/fuel ratio A/Fd which is used in intake air valve position control.

More specifically, under the described lean burn engine control conditions, an operator request for an increase in power is met through direct control of transmission drive ratio to vary engine speed while maintaining a lean air/fuel ratio to reduce BMEP and combustion temperature and to maintain NOx at low levels. This approach may be departed from under specific calibrated high BMEP conditions in which NOx emissions may be high. Under such exceptional high BMEP conditions, an operator demand for an increase in power may be met by increasing fueling to move from the lean burn operating condition to a stoichiometric operating condition to take advantage of the three way catalytic treatment device performance efficiency at stoichiometric operating conditions. Engine speed may be lowered while driving to stoichiometry to provide a fuel economy benefit due to the corresponding reduced engine friction and pumping losses.

Under further calibrated conditions characterized by extremely low BMEP, such as during light engine load and engine overrun operating conditions in which engine out hydrocarbon (HC) emissions levels can be high due to partial combustion of the engine air/fuel mixture and due to misfire conditions, engine speed may be lowered and BMEP increased to stabilize combustion and to reduce HC production.

Figure 7:
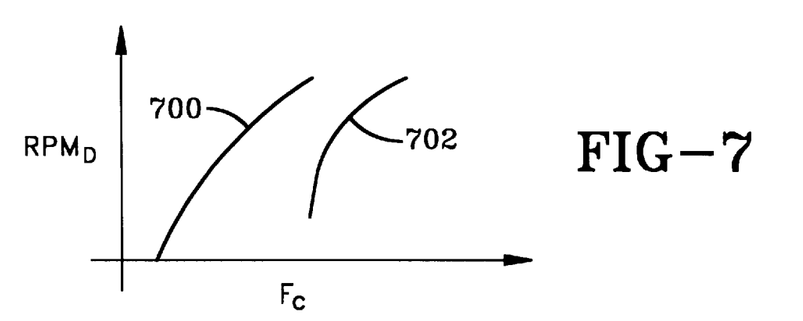

Such considerations are applied in a calibration procedure for determining and storing in the form of a conventional lookup table a schedule of desired engine speed values RPMd as a function of the fuel command FC. Curves 700 and 702 of FIG. 7 illustrate such a calibrated relationship representative of that applied in this embodiment, wherein RPMd increases substantially as a function of Fc along curve 700 throughout a range of low Fc values for lean burn engine operation with engine speed increase used to accommodate engine power requirements, and wherein RPMd drops to a significantly reduced magnitude along curve 702 as a function of Fc throughout a range of high Fc values to depart from lean burn engine control with and to provide for BMEP increase to accommodate engine power requirements. It should be noted that the curves of FIG. 7 may vary within the scope of this invention to account for a desired coordinated control of transmission drive ratio to control engine speed, engine fuel/cylinder and engine intake air rate to allow for minimized emissions at all engine operating conditions, without unnecessary compromise of engine fuel economy and engine performance.

Returning to FIG. 5, after referencing, for a current FC value, a desired engine speed value RPMd, a magnitude of an engine speed error is analyzed at a next step 522. Engine speed error is a difference between actual engine speed RPMa as indicated by a processed RPMa signal from transducer 26 of FIG. 1 and the referenced RPMd value. If a substantial non-zero engine speed error is determined to be present at the step 522, then CVT control operations are required to drive the error toward zero, and a desired drive ratio DR is next calculated at a step 524. DR may be determined through application of the engine speed error to a control function of any generally known form, such as a proportional-plus-derivative-plus-integral control function to generate a transmission drive ratio that will rapidly reduce the error with minimum overshoot and minimum oscillations as is well-known in the engine speed control art. A drive ratio control command is next generated and output to the actuator 34 of FIG. 1 at a next step 526. The drive ratio control command is generated as a function of the desired drive ratio DR as the command required by actuator 34 of FIG. 1 to orient the CVT 30 to provide a drive ratio of DR between the input shaft 24 and the output shaft 32 thereof, as is generally understood in the art. The details of the control of the actuator in accord with the drive command are as described in U.S. Pat. No. 5,046,177, assigned to the assignee of this application.

Figure 8:
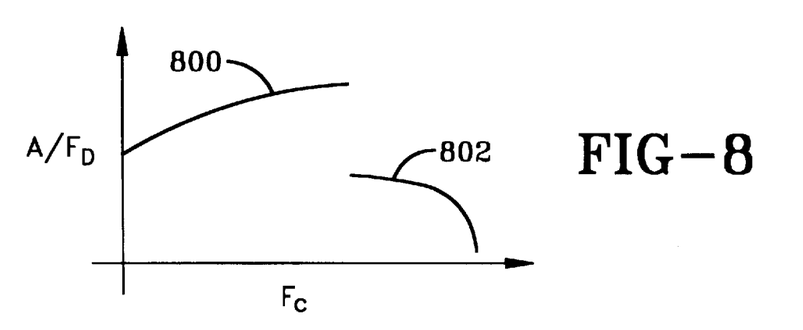

Following the step 526, or if no substantial engine speed error was determined to be present at the step 522, a desired air/fuel ratio A/Fd is next determined at a step 528 as a function of the fuel command Fc. The desired air/fuel ratio A/Fd is determined pursuant to the considerations outlined for the determination of the desired engine speed RPMd at the step 520. For example, lean burn engine control corresponding to a high air/fuel ratio (above the stoichiometric ratio of about 14.5:1) is provided generally, but is departed from under specific operating conditions, such as under conditions corresponding to high BMEP, in which stoichiometric operation may be preferred. Curve 800 and 802 of FIG. 8 generally illustrate a calibrated relationship between Fc and A/Fd in accord with this embodiment, in which high A/Fd is applied for low values of Fc along curve 800 to provide for lean burn engine control, but for high Fc values, such as may correspond to high BMEP conditions, a return to the low desired engine air/fuel ratio, toward the stoichiometric ratio, is provided, to allow the three-way catalytic treatment device to efficiently reduce engine out emissions, as described.

The A/Fd values may be determined through a conventional calibration procedure as a function of Fc to provide for the above considerations and coordinated with the calibration of desired engine speed and desired fuel command Fd, to provide for minimized emissions, and maximized powertrain performance and fuel economy. The calibrated A/Fd values may be stored in the form of a lookup table as a function of Fc. The curves of FIG. 8 may vary within the scope of this invention to provide for coordinated control of engine air/fuel ratio with control of engine fueling and engine speed to minimize emissions and to avoid unnecessary compromise in fuel economy and performance, as described.

After referencing A/Fd from the stored table or schedule, an actual engine air/fuel ratio A/Fa is estimated at a next step 530. Actual air/fuel ratio may be estimated using standard exhaust gas oxygen sensor signal information (not illustrated) or using an open-loop estimated based on measured mass airflow into the engine, any quantity of dilution gas recirculated to the engine intake, and the current fuel flow rate. Air/fuel ratio error is next determined and analyzed at a step 532. Air/fuel ratio error is generally a difference between desired and actual air/fuel ratio. If a significant air/fuel ratio error is determined to be present at the step 532, a change in intake air valve position is required to adjust intake air rate to drive the error toward zero. Accordingly, an updated intake air valve position command Pc is determined at a next step 534, for example through application of a standard control function to the air/fuel ratio error to rapidly drive the error toward zero with minimum overshoot and oscillation, as is well-understood in the art. Pc may take any standard form, such as a duty cycle for cycling a full drive voltage across active coils of actuator 22 of FIG. 1. The position command Pc is next output to the actuator drive circuitry 52 of FIG. 4 at a step 536, to provide for application of a drive signal to the actuator 22 of FIG. 4 to position the actuator in accordance with the desired intake air valve position. Next, or if no significant air/fuel ratio error is determined to be present at the described step 532, the control operations of the routine of FIG. 5 are concluded by proceeding to a next step 538 to return to any prior operations that were ongoing at the time of initiation of the operations of FIG. 5 and were suspended to allow the operations of FIG. 5 to be carried out. The operations of FIG. 5 are repeated while the controller is operating and may include standard ignition timing operations for timing ignition of the air/fuel mixture delivered to engine cylinders, and other standard control and diagnostics operations to allow for overall powertrain control with the advantages of lean burn engine control with minimized emissions, and maximized performance and fuel economy.

The preferred embodiment is not intended to limit or restrict the invention since many modifications may be made through the exercise of ordinary skill in the art without departing from the scope of the invention.

The embodiments of the invention in which a property or privilege is claimed are described as follows.

What is claimed is:

1. A powertrain control method for controlling admission of air and fuel into a lean burn internal combustion engine and for controlling a continuously variable drive ratio of a transmission coupled to the engine, comprising the steps of:

sampling input signals indicating a current engine operating condition;

detecting when a predetermined lean burn engine operating condition characterized by low cylinder mean effective pressure is present, sensing a desired powertrain output power level; and while the predetermined lean burn engine operating condition is present, (a) selecting transmission drive ratio, engine fuel quantity per cylinder, and engine air volume per cylinder, as the control parameters that may be controlled to yield the desired powertrain output power level with minimum emissions, and (b) increasing engine fuel per cylinder and engine air volume per cylinder and decreasing transmission drive ratio to provide for the desired powertrain output power level with minumum emissions.

2. A powertrain control method for controlling admission of air and fuel into a cylinder of a lean burn internal combustion engine and for controlling a continuously variable drive ratio of a continuously variable transmission coupled to the engine, comprising the steps of:

sampling input signals indicating a current engine operating condition;

estimating engine cylinder mean effective pressure;

determining when the estimated engine cylinder mean effective pressure is less than a predetermined threshold pressure, indicating a low mean effective pressure condition;

detecting when the current engine operating condition is a predetermined lean burn engine operating condition;

sensing a commanded change in a powertrain output power level; and while the predetermined lean burn engine operating condition is detected, (a) selecting transmission drive ratio, engine fuel quantity per cylinder and engine air volume per engine cylinder as the control parameters that may be controlled to provide a powertrain output power level change corresponding to the commanded change in powertrain output power level with minimum emissions, and (b) increasing engine fuel quantity per cylinder and engine air volume per cylinder while decreasing transmission drive ratio to provide for the powertrain output power level change while the low mean effective pressure condition is indicated to provide for the commanded change in powertrain output power level with minimum emissions.

* * * * *